Feb. 23, 1960

A. R. FOREST 2,925,669

GRAPHIC EXHIBITOR

Filed April 22, 1957

INVENTOR.
ALEXANDER R. FOREST
BY
*Kenyon & Kenyon*
ATTORNEYS

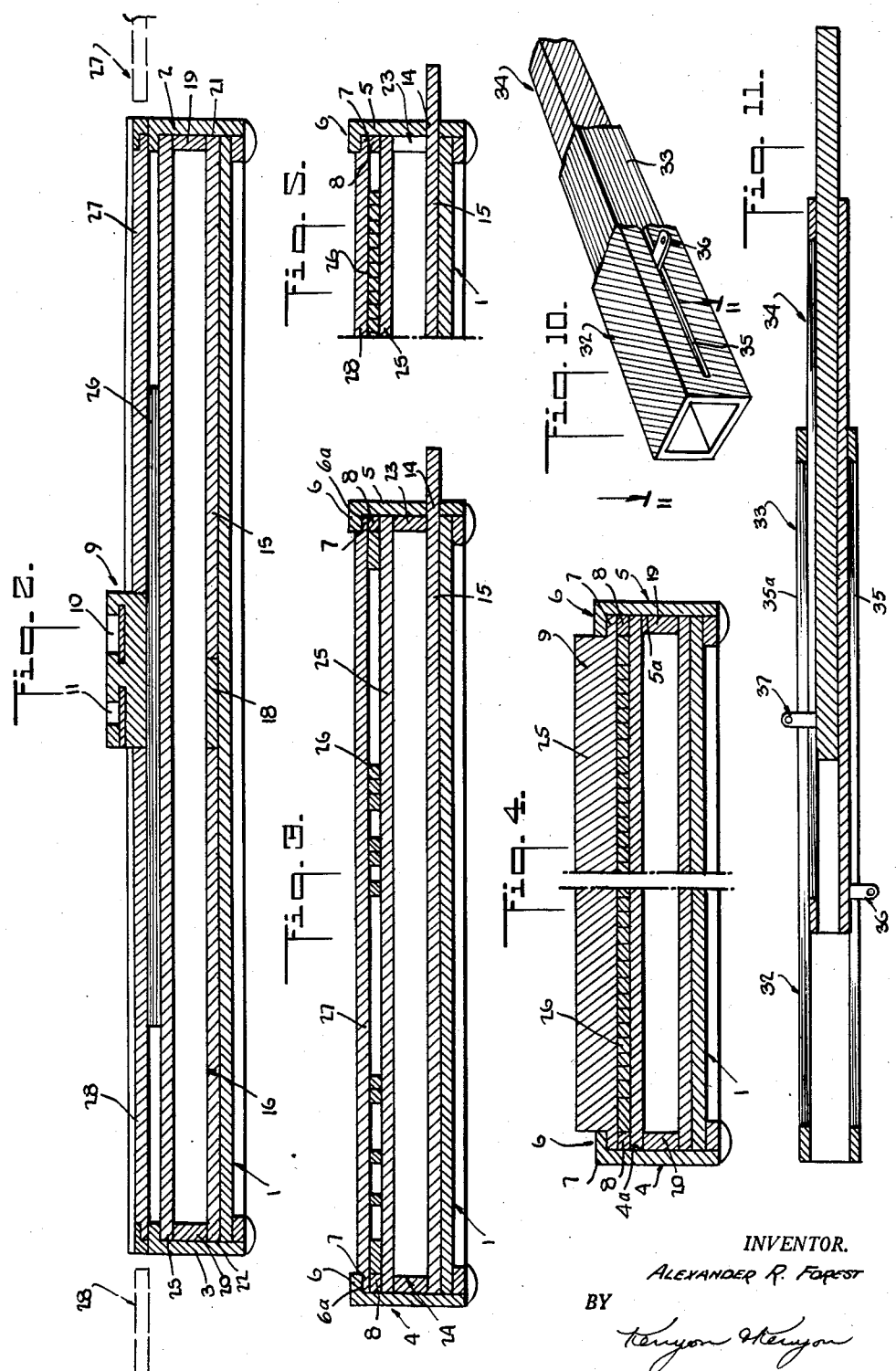

Feb. 23, 1960 A. R. FOREST 2,925,669
GRAPHIC EXHIBITOR
Filed April 22, 1957 6 Sheets-Sheet 3
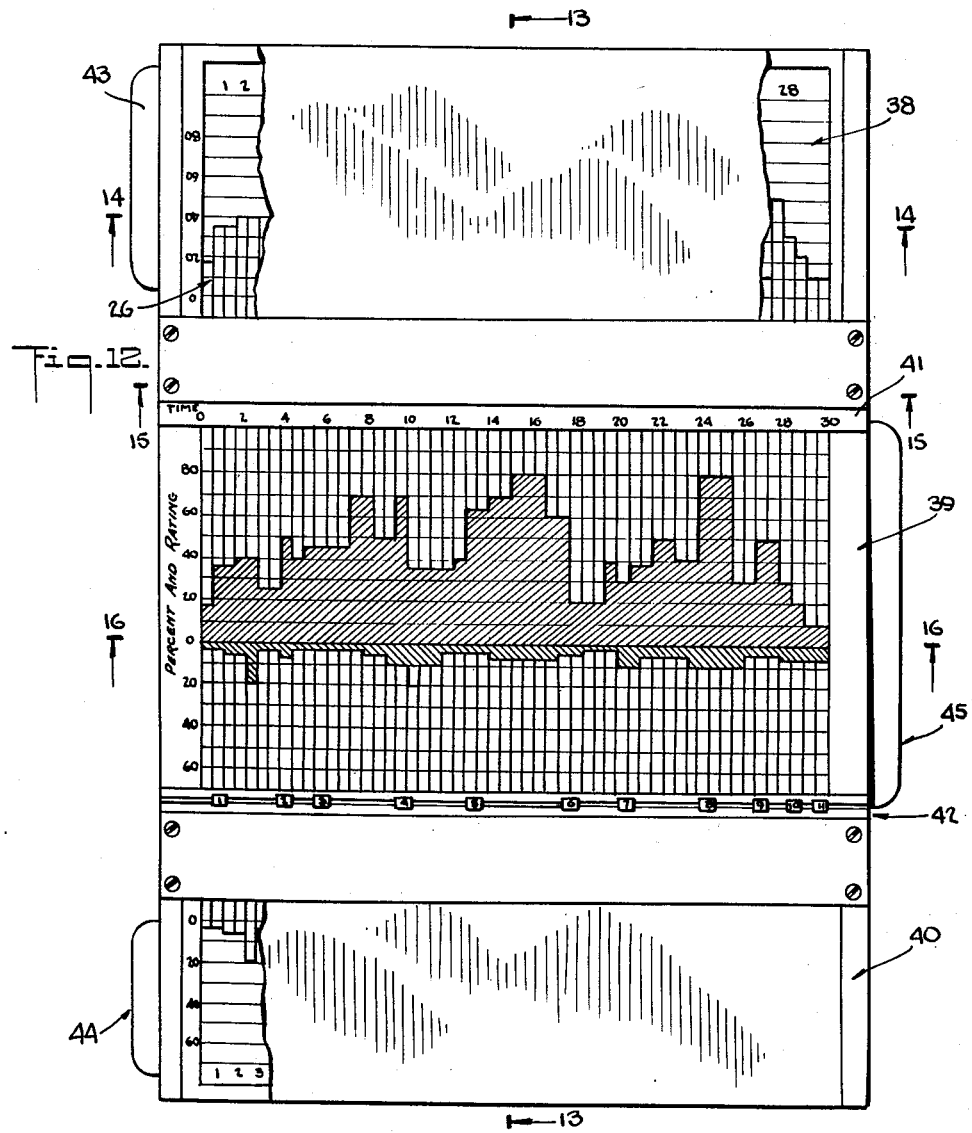
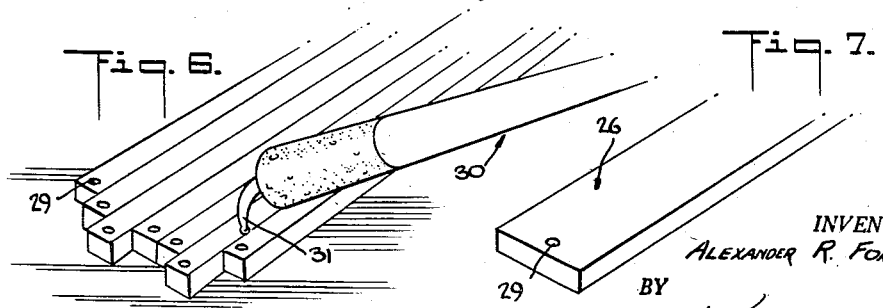
INVENTOR.
ALEXANDER R. FOREST
BY
ATTORNEYS

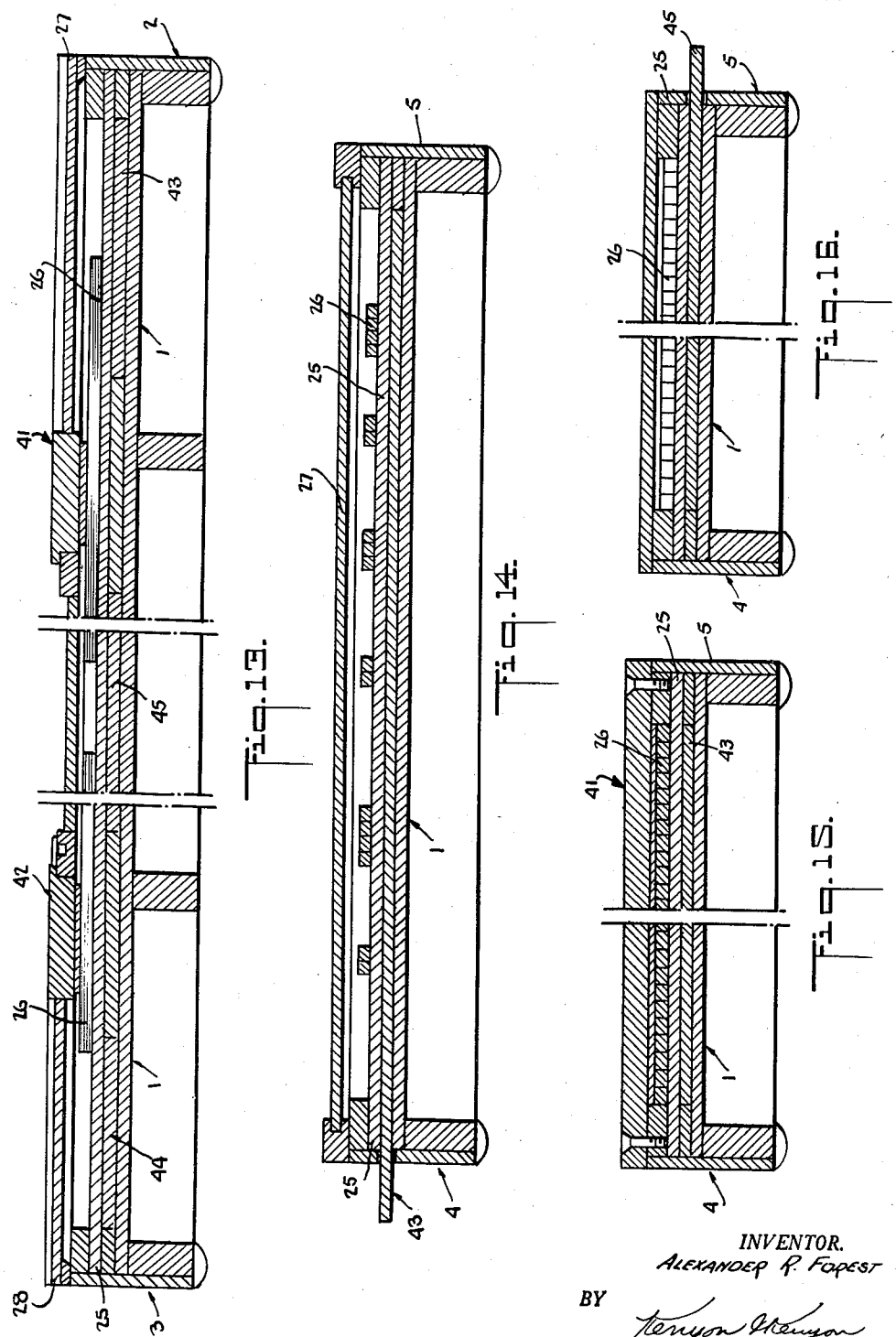

Feb. 23, 1960  A. R. FOREST  2,925,669
GRAPHIC EXHIBITOR
Filed April 22, 1957  6 Sheets-Sheet 5
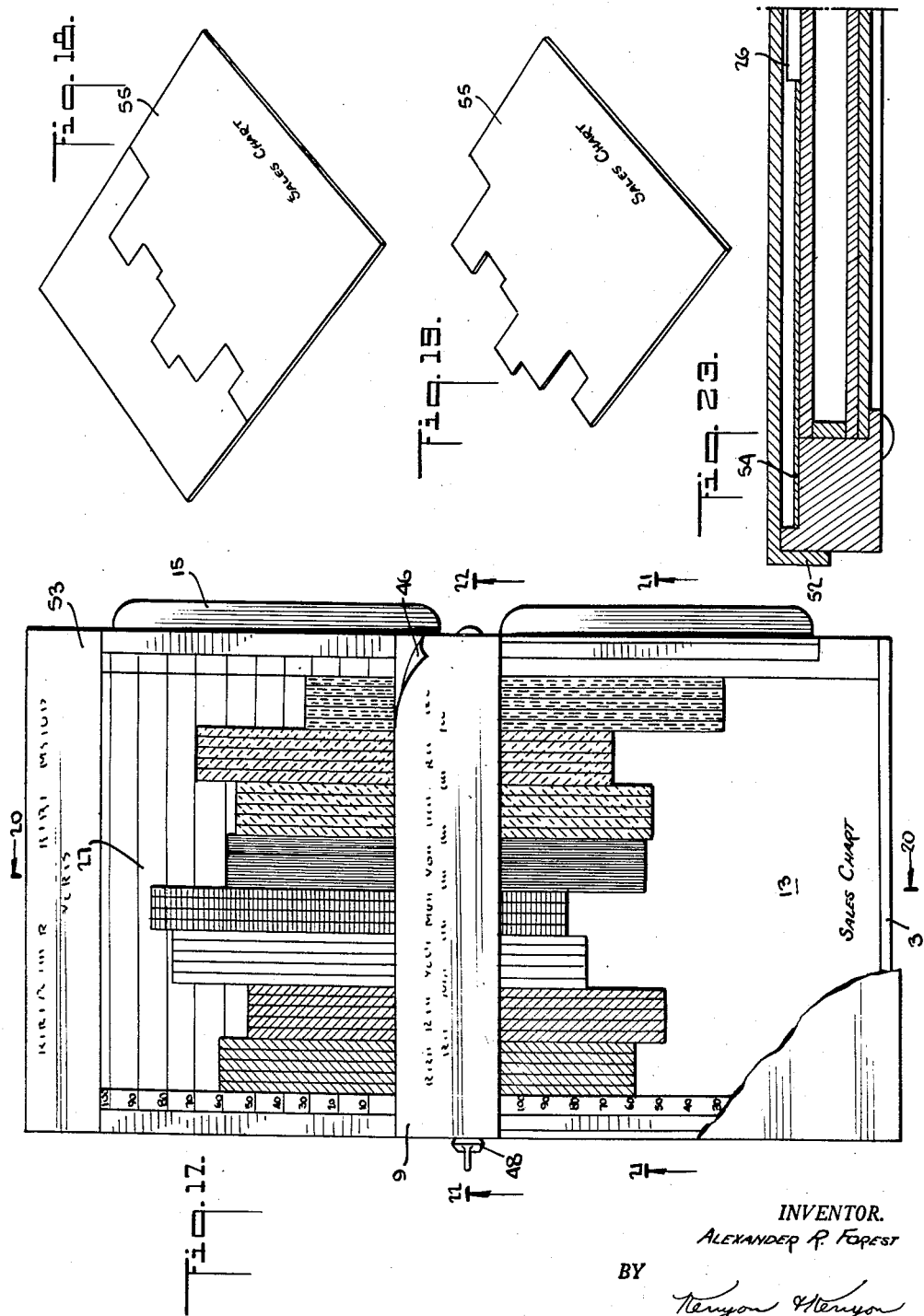
INVENTOR.
ALEXANDER R. FOREST
BY
ATTORNEYS Feb. 23, 1960 A. R. FOREST 2,925,669
GRAPHIC EXHIBITOR
Filed April 22, 1957 6 Sheets-Sheet 6
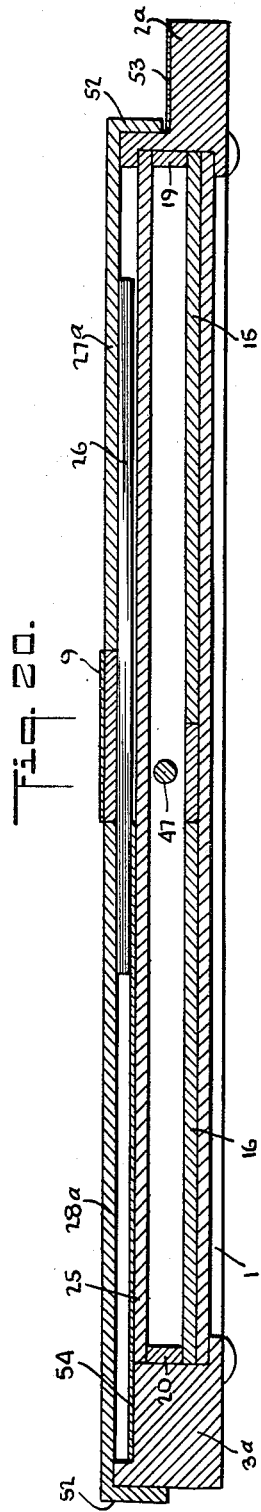
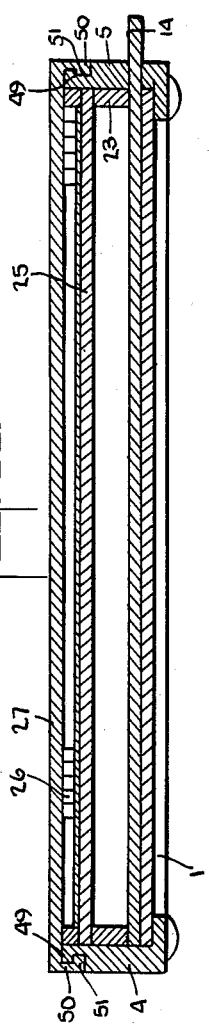
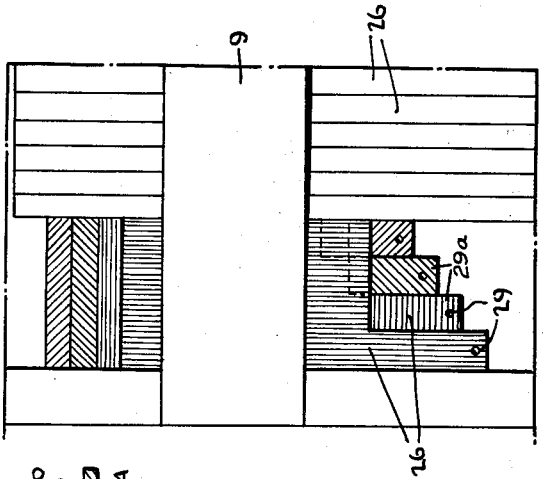
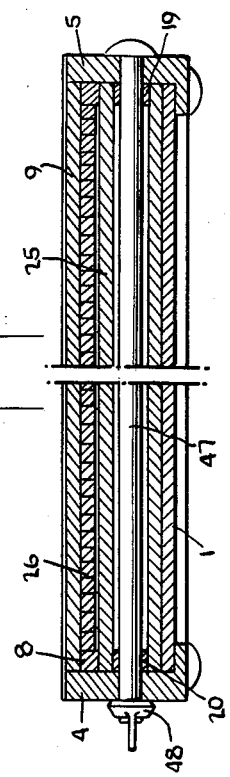
INVENTOR.
ALEXANDER R. FOREST
BY
Kenyon & Kenyon
ATTORNEYS

United States Patent Office 2,925,669
Patented Feb. 23, 1960

2,925,669

GRAPHIC EXHIBITOR

Alexander R. Forest, New York, N.Y.

Application April 22, 1957, Serial No. 654,134

3 Claims. (Cl. 35—24)

This invention relates to graphic exhibitors, and more particularly to a graphic exhibitor with variable indicators by means of which statistical information ordinarily represented by figures may be visually represented graphically.

In recent years the increased use of statistics in business, education, science and other fields has created a need for a graphic exhibitor which can be used to visually compare information concerning two or more static entities or variables which fluctuate with the passage of time. Rather than reconstruct the entire graphical representation each time that a fluctuation in one of the variables occurs, it is desirable to include in the exhibiting device a means for rapidly depicting the change in the variable without completely reconstructing the graph. A feature common to all known devices utilized to visually compare two or more variables is that they contain indicators movable within a frame. The indicators, however, although movable in the plane of the frame, are generally attached to or permanently installed with respect to the frame in order to maintain them in a fixed spaced relationship. These devices are therefore restricted in the applications to which they may be applied.

In view of the foregoing, it is one object of the present invention to provide a graphic exhibitors which is simple and inexpensive to manufacture and in which the indicators are interchangeable, removable and can themselves be varied in size, shape and color.

More specifically it is an object of this invention to provide a graphic exhibitor in which the indicators may be easily and rapidly adjusted to and maintained in their desired position.

Yet another object of this invention is to provide a graphic exhibitor with a removable photographic plate to record on film the graphical representation.

It is a further object of this invention to provide a graphic exhibitor in which a multiplicity of variables may be simultaneously compared in the form of graphs.

It is still a further object of this invention to provide a graphic exhibitor which can be readily adjusted or reset by means of a pattern which is adapted to manually reset all of the indicators simultaneously.

These and further objects of the invention will be more clearly understood from the following description and from the accompanying drawings in which:

Fig. 2 is an enlarged cross-section taken along lines 2—2 of Fig. 1, the view otherwise being a side elevation;

Fig. 5 is an enlarged cross-section taken along lines 5—5 of Fig. 1;

Fig. 6 is a perspective view of a multiplicity of indicating elements placed in side to side relation and a tool which can be utilized to vary the position of the indicating elements;

Fig. 7 is a perspective view of one of the indicating elements illustrated in Fig. 6, but with a rectangular rather than square cross-section;

Fig. 8 is a front elevation of the top portion of the device illustrated in Fig. 1 with the indicating elements illustrated in Fig. 7;

Fig. 9 is a view similar to Fig. 8, but with a modified form of indicating elements;

Fig. 10 is a perspective view of one of the indicating elements illustrated in Fig. 9 illustrating a method for varying the position of the indicating element;

Fig. 11 is an enlarged cross-section taken along line 11—11 of Fig. 10;

Fig. 12 is a front elevation of a modified form of the device of the present invention, the view otherwise being similar to Fig. 1;

Fig. 13 is an enlarged cross-section taken along lines 13—13 of Fig. 12;

Fig. 14 is an enlarged cross-section taken along lines 14—14 of Fig. 12;

Fig. 15 is an enlarged cross-section taken along lines 15—15 of Fig. 12;

Fig. 16 is an enlarged cross-section taken along lines 16—16 of Fig. 12;

Fig. 17 is a front elevation of a modified from of the device of the present invention, the view otherwise being similar to Figs. 1 and 12;

Fig. 18 is a perspective view of a card utilized to record the statistical data on the graphic exhibitor of the present invention;

Fig. 19 is a perspective view of the card illustrated in Fig. 18 as utilized to reconstruct the statistical data previously recorded on the card;

Fig. 20 is an enlarged cross-section taken on lines 20—20 of Fig. 17;

Fig. 21 is an enlarged cross-section taken on lines 21—21 of Fig. 17;

Fig. 22 is an enlarged cross-section taken on lines 22—22 of Fig. 17;

Fig. 23 is an exploded view of a portion of Fig. 20; and

Fig. 24 is a partial front elevation of the device illustrated in Fig. 17 with a modified form of indicating elements.

Figure 3:
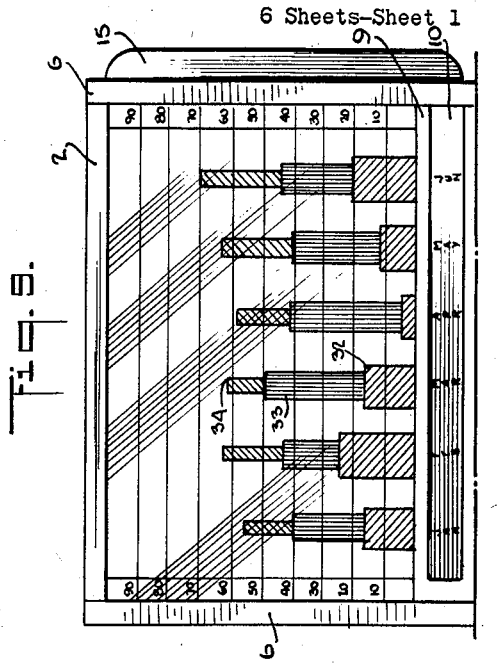
Fig. 3 is an enlarged cross-section taken along lines 3—3 of Fig. 1.

Referring now to the drawings, there is shown a frame generally rectangular in cross-section comprising a base 1, end marginal flanges 2, 3, and side marginal flanges 4 and 5. The marginal flanges 2, 3, 4 and 5 are disposed at right angles to the base 1 and, in cooperation with the base, form an enclosure. In the embodiment illustrated in Fig. 3, the top portions of the side marginal flanges 4 and 5 are formed with shoulders 6 which are disposed at right angles to the side marginal flanges and project into the plane of the frame. The height of the side marginal flanges 4, 5 is greater than the height of the end marginal flanges 2, 3 the space 6a between the top and bottom marginal flanges and the shoulders providing channels 7. In order to provide a travelway along the length of the frame, guide frames 8 are attached to the inner surfaces of the side marginal flanges parallel to the base 1 and extending between the end marginal flanges. The channels 7 are provided for a purpose to be presently described.

Figure 4:
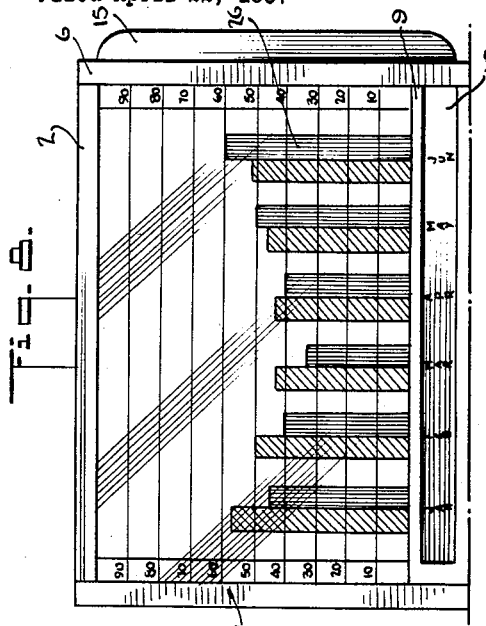
Fig. 4 is an enlarged cross-section taken along lines 4—4 of Fig. 1.

A bracket 9 is positioned intermediate the end marginal flanges 2, 3 extending transversely between the side marginal flanges 4, 5. As illustrated in Fig. 4, the bottom of the bracket 9 is supported by the guide frames 8, the edges of the bracket 9 abutting against the outer edge of the shoulders 6 and the inner faces 4a and 5a of the side marginal flanges. In this embodiment the bracket 9 is formed with two channels 10 and 11 extending the length of the brackets, the channels 10 and 11 being open and accessible at one of the edges of the bracket parallel to the side marginal flanges. The purpose of these channels is to receive strips of paper or other material having written matter on one face thereof visible through the top of the bracket. The bracket 9 effectively divides the frame into two portions, a top portion 12 and a bottom portion 13.

If desired sheets of paper or other material 46 with an adhesive backing may be cut to the shape of the bracket 9. A plurality of these sheets can be fabricated at one time with written matter on the front face corresponding to the type of data it is desired to graphically depict. When data is to be plotted corresponding to the information on one of these sheets, the sheet positioned on the bracket 9 is simply peeled off as illustrated in Fig. 17, and replaced with the new sheet. The sheet that was replaced is then stored until such time as it is needed. If these sheets are utilized, the channels 10 and 11 in the bracket 9 may be eliminated.

Side marginal flange 5 is provided with openings 14 in the top portion 12 of the frame and the bottom portion 13 of the frame, through which plates 15 and 16 may be inserted. These openings 14 are provided near the bottom of the side marginal flange 5 and extend approximately the length of the top and bottom portions of the frame. Plates 15 and 16 are inserted through the openings 14 and when completely inserted abut against the inner face of side marginal flange 4. The plates 15 and 16 are supported by the base 1, and are guided along one edge by a guide frame 18 resting on the base 1 and extending transversely between the side marginal flanges 4, 5. The other edge is guided by the end marginal flange 2 for one plate and the opposing end marginal flange 3 for the other plate. In order to insure that the plates 15 and 16 are inserted parallel to the base 1 and to prevent vertical movement of the plates once they are inserted, spacer blocks 19 and 20 are secured to the inner face of the end marginal flanges extending transversely between the side marginal flanges. The spacer blocks 19 and 20 provide channels 21 and 22 to guide the outer edges of the plates 15 and 16. Spacer blocks 23 and 24, similar to spacer blocks 19 and 20, are secured to the inner faces of the side marginal flanges extending transversely between the end marginal flanges, and further serve to guide the plates 15 and 16 as they are inserted in the openings 14.

The spacer blocks 19, 20, 23 and 24 also serve to support a secondary base made of glass or other transparent material. This secondary base 25 is parallel to the base 1 and abuts against the inner faces of the side, bottom and top marginal flanges. The height of the spacer blocks 19 and 20 is such that the space between the top of the spacer blocks 19 and 20 and the bottom of the shoulders 6 is approximately the same as the width of the secondary base 25. The secondary base is therefore held firmly in a fixed position by means of the spacer blocks 19, 20, 23 and 24 and the shoulders 6. A secondary frame made from transparent material is utilized so that the plates 15 and 16 may be viewed through the top of the frame.

The secondary base 25 serves to support a plurality of indicating elements 26. These indicating elements are positioned in side to side relation on the secondary base 25 and completely fill the area between the side marginal flanges. These indicating elements may take any desired configuration and in one embodiment illustrated in Fig. 6 are generally square in cross-section. The indicating elements are placed on the secondary base parallel to the side marginal flanges and are movable between the top and bottom marginal flanges. The indicating elements are preferably constructed from material that is flexible, such as wood or metal for a purpose to be presently described.

Figure 1:
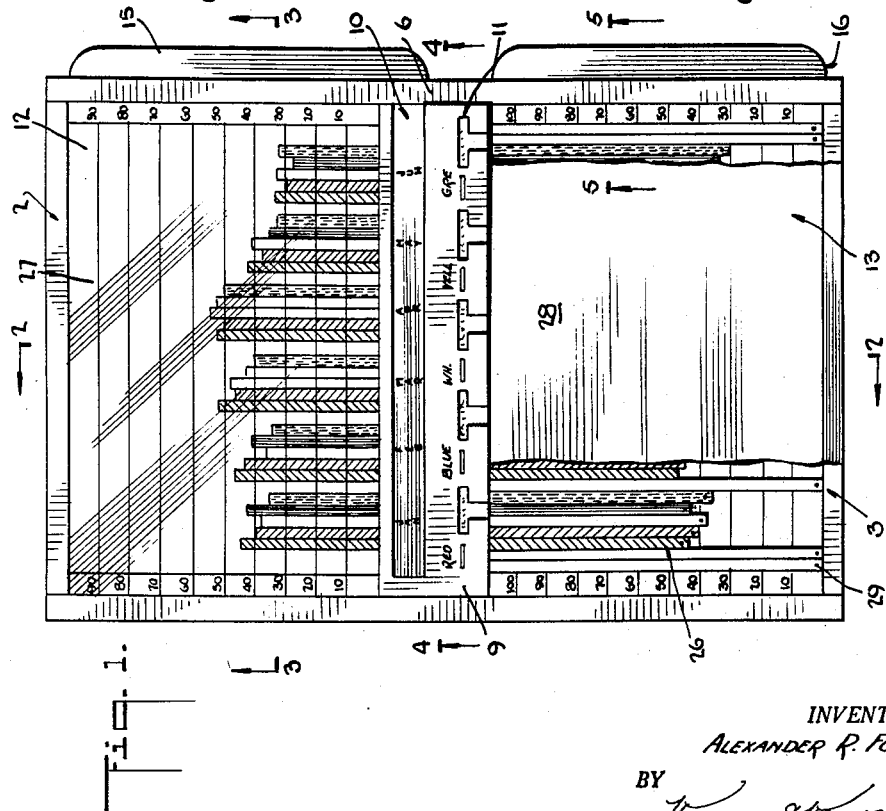
Fig. 1 is a front elevation of the device of the present invention, a portion of the frame being broken away to expose the indicating elements.

With the construction described above, it is possible to visually depict the relationship between two or more variables in graphical form. For example, if it is desired to compare the monthly sales of five different salesmen, the comparison would be made in the following manner. The abscissa of the graph is obtained by inserting a strip of paper or other material in the channel 10 in the bracket 9. As illustrated in Fig. 1, this strip has the first six months of the year printed thereon in spaced chronological order. The strip is visible from the top of the frame, and the channel 10 may be protected by a covering of glass or other transparent material. The names of the salesmen are placed on another strip of paper or other material with a different color next to the name of each salesman. This strip is then inserted in channel 11 in bracket 9, and is also visible from the top of the frame. In this manner the abscissa may be quickly varied by simply removing the strips from the bracket 9 and replacing them with other strips with appropriate markings. The ordinate for the graph, and the corresponding spaced parallel indicia lines, may, in one form of the invention, be placed on the secondary base 25. In another form of the invention, the ordinate may be placed on plates 27 and 28 which are inserted in channel 7 in the end marginal flanges, or on plates 15 and 16 which are inserted through openings 14 in the side marginal flange. Any combination of two of these plates may be utilized for the ordinate and indicia markings, the only restriction being that the markings be present in both the top 12 and bottom 13 of the frame. In this manner both the ordinate and abscissa indicia may be quickly removed and replaced.

The indicating elements are placed on the secondary base 25 by inserting one end of the indicating element under the bracket 9 until the other end abuts against an end marginal flange depending upon the direction of insertion of the indicating element, and then releasing the indicating element and allowing it to snap into place. The material from which the indicating elements are made must be resilient enough to withstand this flexure while being inserted and removed. A plurality of indicating elements are inserted in this manner until the area on the secondary base between the side marginal flanges is completely filled. In the illustrative example, the sales of five salesmen are being graphically compared and five different colored indicating elements are therefore utilized, the colors corresponding to those next to the names of the salesmen. The first five indicating elements on the secondary base will therefore be of different colors, and the color sequence is sequentially repeated across the width of the secondary base. It is to be understood that other differentiating means rather than color may be utilized, as for example cross-hatching. The indicating elements are of such a length that when they are inserted in the bottom 13 of the frame they extend under the edge of the bracket 9 nearest the lower end marginal flange, but do not project beyond the other edge of the bracket nearest the opposing marginal flange.

Each indicating element is provided with a depression 29 on one face thereof preferably at one of the extremities of the indicating element. The indicating elements are inserted so that the depression 29 is near the marginal flange and accessible from the top of the frame. The indicating elements are movable lengthwise in the frame by means of a tool or stylus 30 provided with a tapered end 31, the tapered end being inserted in the depression 29 and the indicating element adjusted to the desired position. When the indicating elements are in the desired position they are held stationary by the bracket 9 and the adjacent indicating elements. It is to be noted that the indicating elements are completely interchangeable, and may be easily removed and replaced by other indicating elements.

When the desired statistical data has been graphically represented a plate 27 or 28 in the top 12 of the frame may be removed and replaced by a photographic plate or a plate covered with sensitized film and the graphical construction photographed by means of this plate.

In order to maintain the indicating elements in a fixed spaced relationship it is important that each indicating element exert a certain amount of pressure on the adjoining indicating element. The number of indicating elements may be varied while still maintaining this feature by varying the width of the indicating elements so that they are generally rectangular in cross-section such as shown in Fig. 7, rather than square in cross-section.

The indicating elements may also be maintained in a fixed spaced relationship by means of a bolt 47 extending transversely between the side marginal flanges 4 and 5. As illustrated in Fig. 22 the bolt 47 is provided with a nut 48 on one end. When the nut 48 is tightened it compresses the side marginal flanges 4 and 5, thereby exerting pressure on the indicating elements and maintaining them in a desired position.

In the modification shown in Fig. 10, three indicating elements are arranged in telescopic relationship. This embodiment facilitates the visual assimilation of data presented in the form of bar graphs. The outer casing 32 is generally rectangular in cross-section, hollow and open at both ends. An intermediate casing 33 is positioned within the outer casing 32 and is slidably movable therein. In a similar manner, inner casing 34 is positioned within intermediate casing 33 and is also movable therein. Slotted openings 35 are provided on two opposite parallel faces of the outer casing 32 extending approximately the length of the outer casings. Lever 36 is attached to intermediate casing 33 and extends through one of the slotted openings 35. Another lever 37 is attached to inner casing 34 and extends through the other slotted opening 35a (shown in Fig. 11) in the outer casing. By means of these levers 36 and 37, the position of the intermediate and inner casing may be varied and maintained within the outer casing.

Another form of indicating element is illustrated in Fig. 24, which facilitates the simultaneous comparison of a plurality of variables. In this embodiment a plurality of indicating elements 26 are arranged in overlapping or laminated relationship, with the bottom portion of each accessible so that it may be independently positioned. In this embodiment the structure is shown diagrammatically to indicate an exhibitor which, in general form, is like the exhibitor shown in great detail in Fig. 1. The only difference is that the indicating elements 26 as shown in shaded form to the left side of this exhibitor are comprised of cards which are notched at the bottom in such a manner that a finger 29a protrudes downwardly through each card so that each card can be moved up and down independently of any of the other cards. With these card-shaped indicator elements 26 positioned in overlapping relationship to one another it is possible to expose segments of the tops of the cards independently of other cards as desired to produce a graphic effect in the viewing area.

In the modification shown in Fig. 12, the construction is the same as that shown in Fig. 1 with the exception that the frame is generally divided into three portions, a top portion 38, a middle portion 39 and a bottom portion 40. Bracket 41 divides the top portion 38 from the middle portion 39, and bracket 42 divides the bottom portion 40 from the middle portion 39. Plates 43 and 44 are inserted through side marginal flange 4, plate 43 being inserted in the top portion 38 and plate 44 in the bottom portion 40. These plates serve the same function as plates 15 and 16. An additional plate 45 is inserted in the middle portion 39 through side marginal flange 5 and also serves the same purpose as plates 15 and 16. Indicating elements are positioned in the top portion and bottom portion and the data is graphically depicted in the middle portion. This construction increases the number of variables that may be simultaneously plotted and aids in the visual comparative assimilation of certain types of data.

The graphic exhibitor illustrated in Fig. 17 is similar in construction to that shown in Fig. 1, but incorporates several modifications. One of these modifications consists of the manner in which the plates 27 and 28 are held in position between the side marginal flanges 4 and 5. The modification consists of providing channels 49 in the exterior sides of the side marginal flanges 4 and 5. The plates 27 and 28 are constructed with flanges 50 terminating in extensions 51 engageable by the channels 49 and slidably movable therein. The ends of the plates 27 and 28 are also provided with flanges 52 which bear against the end marginal flanges 2, 3 when the plates 27 and 28 are completely inserted. Another modification illustrated is the increase in width of the end marginal flanges 2, 3 to provide surfaces 53 and 54 at the top and bottom of the device of the present invention. These areas 53 and 54 may be covered with removable tape or adhesive backed sheets of paper on which may be noted the type of information that is being graphically represented.

Once data has been graphically represented on the device of the present invention, it is often desired to preserve this information so that it may be graphically reconstructed at a future date without the necessity of replotting each set of coordinates. This is accomplished by means of the card as illustrated in Figs. 18 and 19, which is fabricated from any suitable material such as cardboard, plastic or paper, the only requirement being that it may be readily perforated or scored. This card 55 is sized to fit the top 12 or bottom 13 portions of the frame. The card is placed either over the plates 27 and 28 or directly over the indicating elements 26 and the card perforated at the extremity of each indicating element. The card is then cut along the perforations and when this has been done, as illustrated in Fig. 19, a permanent record of the graphical data is obtained. The data plotted is noted on the card and the card is stored away until such time as it is desired to reconstruct the data. When it is desired to reconstruct the data, the card or pattern 55 is placed over the plate 27 or 28 and the indicating elements 26 are positioned adjacent the perforated edge of the pattern 55. In this manner the graphical representation may be quickly and easily reconstructed. A method of so reconstructing the graphical representation by use of this card or pattern 55 is to loosen the bolt 47 by means of the nut 48 so that the indicating elements 26 will slide readily, tilting the device so that these elements slide away from the area over which the pattern 55 is placed, placing the pattern on the plate 27 or 28, tilting the device again so that the indicating elements fall down against the pattern, tightening the nut 48 to again secure the indicating elements 26 and removing the pattern 55. It will be appreciated that this entire operation will take a matter of seconds.

It is to be understood that the specific structure described herein may be modified by a person skilled in the art without departing from the spirit of this invention, which is limited only by the scope of the claims which follow.

I claim:

1. A graphic exhibitor comprising a base having marginal side and end flanges enclosing said base, a bracket extending transversely between said marginal side flanges midway between said end marginal flanges and spaced from said base, a transparent platform parallel to said base, said platform being enclosed by said marginal and end flanges and positioned between said base and said bracket in spaced relationship therefrom, one of said side marginal flanges having two elongated openings therein between said transparent platform and said base, said openings extending from said bracket to said end marginal flanges parallel to said transparent platform, plates having a plane surface extending through said openings parallel to said transparent platform and removable therefrom, said plates when completely inserted in said openings abutting the inner face of the other of said side marginal flanges, said plates having a scale thereon indicating vertical distance on said transparent platform, said bracket having a removable scale thereon indicating horizontal distance on said base, a plurality of elongated indicating elements having plane surfaces mounted on said transparent platform between said marginal side flanges in side to side relationship, said indicating elements being slidably movable on said transparent platform parallel to said marginal side flanges, and said indicating elements being removable from said transparent platform.

2. A graphic exhibitor comprising a base having marginal side and end flanges enclosing said base, two brackets extending transversely between said marginal side flanges and spaced from said base, said brackets dividing said base into three portions, a transparent platform parallel to said base, said platform being enclosed by said marginal and end flanges and positioned between said base and said brackets in spaced relationship therefrom, said side marginal flanges having elongated openings therein between said transparent platform and said base, said openings extending between said brackets and between said brackets and said end marginal flanges parallel to said transparent platform, plates having a plane surface extending through said openings parallel to said transparent platform and removable therefrom, said plates when completely inserted in said openings abutting the inner face of the other of said marginal flanges, said plates having a scale thereon indicating vertical distance on said transparent platform, said brackets having a removable scale thereon indicating horizontal distance on said transparent platform, a plurality of elongated indicating elements having plane surfaces mounted on said transparent platform between said marginal side flanges in side to side relationship, said indicating elements being mounted on said transparent platform between said top and bottom marginal flanges and said brackets and slidably movable on said transparent platform between said brackets parallel to said marginal side flanges, and said indicating elements being removable from said transparent platform.

3. A graphic exhibitor comprising a base having marginal side and end flanges enclosing said base, two brackets extending transversely between said marginal side flanges and spaced from said base, said brackets dividing said base into three portions, a transparent platform parallel to said base, said platform being enclosed by said marginal and end flanges and positioned between said base and said brackets in spaced relationship therefrom, said side marginal flanges having elongated openings therein between said transparent platform and said base, said openings extending between said brackets and between said brackets and said end marginal flanges parallel to said transparent platform, plates having a plane surface extending through said openings parallel to said transparent platform and removable therefrom, said plates when completely inserted in said openings abutting the inner face of the other of said marginal flanges, said plates having a scale thereon indicating vertical distance on said transparent platform, said brackets having a removable scale thereon indicating horizontal distance on said transparent platform, channels provided on the inner surfaces of said side marginal flanges parallel to said transparent platform extending from said brackets to said end marginal flanges, said channels being spaced from said transparent platform, cover plates slidably movable in said channels, said cover plates when completely inserted in said channels abutting the edges of said brackets, a plurality of elongated indicating elements having plane surfaces mounted on said transparent platform between said marginal side flanges in side to side relationship, said indicating elements being mounted on said transparent platform between said end marginal flanges and said brackets and slidably movable on said transparent platform between said brackets parallel to said marginal side flanges, and said indicating elements being removable from said transparent platform.

References Cited in the file of this patent

UNITED STATES PATENTS

| | | |
|---|---|---|
| 649,054 | Holibaugh | May 8, 1900 |
| 1,268,613 | Radebaugh | June 4, 1918 |
| 2,068,226 | Buck | Jan. 19, 1937 |
| 2,166,853 | Ammann | July 18, 1939 |

FOREIGN PATENTS

| | | |
|---|---|---|
| 504,221 | France | Apr. 8, 1920 |